Aug. 11, 1964  A. M. GILDONE  3,144,179
AEROSOL VALVE
Filed May 5, 1961
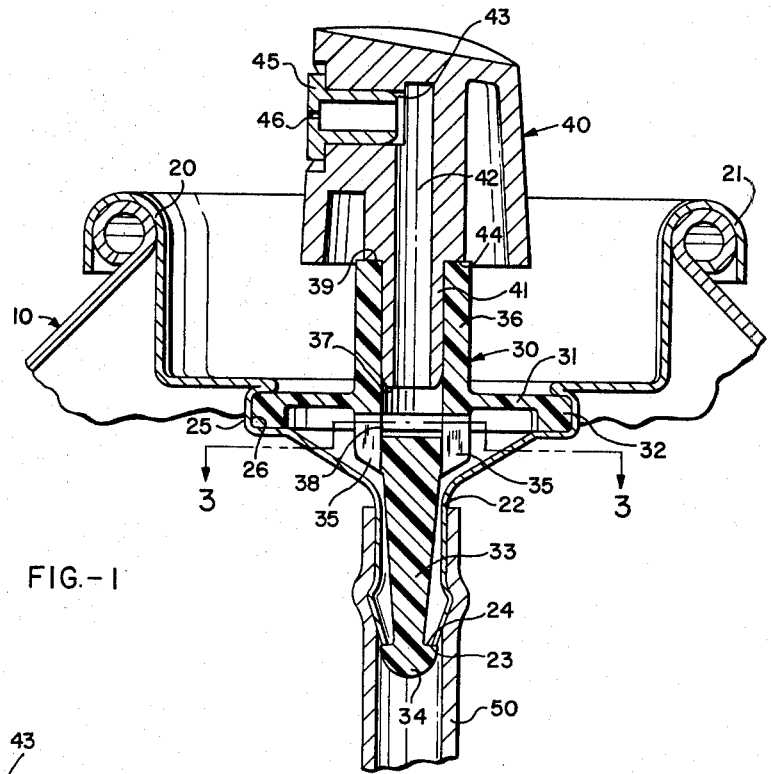
FIG.-1
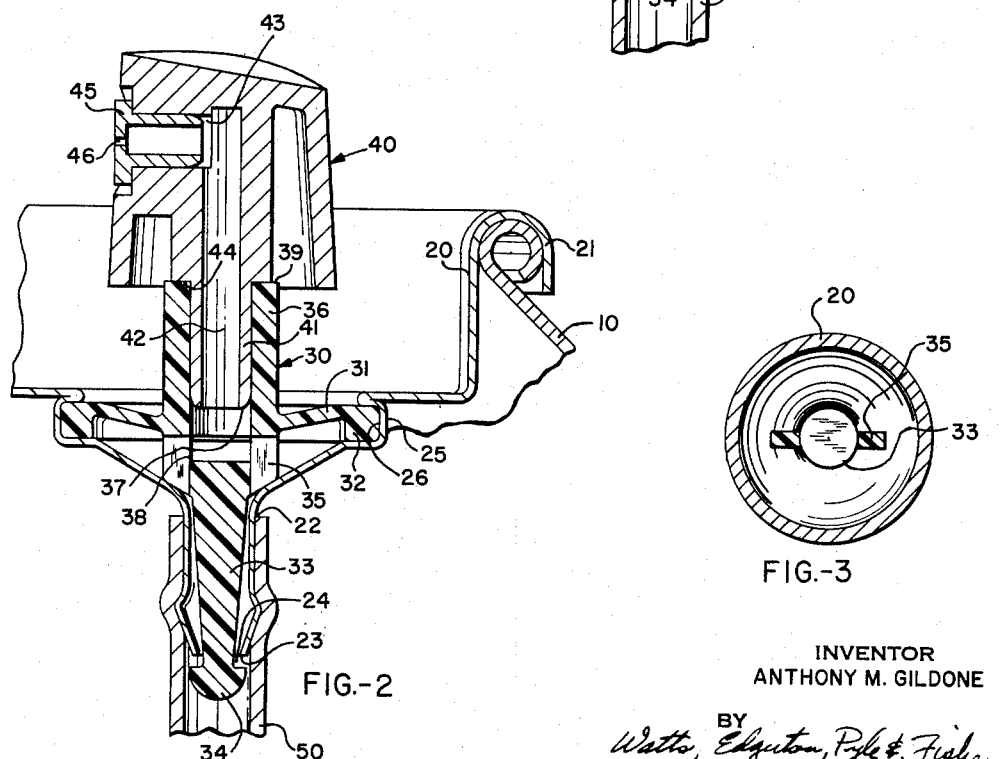
FIG.-2
FIG.-3
INVENTOR
ANTHONY M. GILDONE
BY
Watts, Edgerton, Pyle & Fisher
ATTORNEYS

United States Patent Office 3,144,179
Patented Aug. 11, 1964

3,144,179
AEROSOL VALVE
Anthony Michael Gildone, 26580 Oriole Ave.,
Cleveland 32, Ohio
Filed May 5, 1961, Ser. No. 108,070
3 Claims. (Cl. 222—394)

This invention relates to dispensing devices and more particularly to a simplified valve mechanism for pressurized containers.

It is a principal object of this invention to provide a simplified valve assembly for pressurized containers.

A more particular object of this invention is to provide a valve assembly for pressurized containers embodying a deformable plastic valve stem normally urged into sealing engagement with a rigid valve seat.

A still more particular object of this invention is to provide a valve assembly for pressurized containers embodying a diaphragm urging a deformable plastic stem into sealing engagement with a rigid valve seat.

Yet another more general object of this invention is to provide a valve assembly for pressurized containers which minimizes the number of possible leakage regions.

Still another object of this invention is to provide a standard size valve cap into which any one of a plurality of spray nozzles may be fitted.

Other objects and a fuller understanding of the invention may be had by referring to the following description and claims taken in conjunction with the accompanying drawing in which:

FIGURE 1 is a longitudinal sectional view of the valve assembly showing a portion of a pressurized container with the valve assembly fitted thereto with the valve closed.

FIGURE 2 is a view similar to FIGURE 1 except that the valve is in the open position; and, FIGURE 3 is a sectional view taken along the plane designated by the line 3—3 of FIGURE 1.

Referring now to the drawing, a portion of a container is shown and designated generally by the reference character 10.

The novel and improved valve assembly includes a valve cup 20 formed of a single sheet of rigid metal which is suitable to be crimped onto the container 10 as at 21. The valve cup 20 is generally funnel-shaped and includes a tubular extension 22 terminating at an annular shoulder 23 which defines an inlet opening 24. The annular shoulder 23 serves as a valve seat as will become readily apparent. The valve cup 20 also includes a wall portion 25 defining an annular recess 26.

A valve designated generally as 30 is disposed in the valve cup 20 and includes a flexible diaphragm 31 terminating at an annular skirt 32. The annular skirt 32 is disposed in the annular recess 26 and in fluid-tight contact with the wall portion 25. The diaphragm 31 is flexible along the axis of the tubular extension 22.

A valve stem 33 projects substantially normal to the diaphragm 31 and is connected thereto by two circumferentially spaced webs 35. The stem extends through the inlet opening 24 and has an enlarged head 34 outside the valve cup 20. The diaphragm and valve stem are formed of a deformable plastic material and the diaphragm is constructed to normally urge the enlarged head 34 into sealing engagement with the annular shoulder 23. This provides a fluid tight seal and prevents any fluid from entering the valve cup 20 when the valve is in the closed position.

The valve 30 is, in assembly, telescoped into the cup 20 before the recess 26 and the head 34 are fully formed. After the valve is positioned in the cup, the cup is crimped over the skirt 32 to complete the recess 26 and the stem 33 is heat deformed to mold the head 34.

The valve 30 also includes a tubular projection 36 extending from the diaphragm 31 in a direction opposite that which the valve stem 33 extends. The tubular projection 36 has an internal passage 37 and a plurality of inlet ports 38 connecting the passage 37 with the tubular extension 22. The tubular projection 36 terminates at a pressure shoulder 39.

A cap designated generally as 40 is provided. The cap 40 has an extension 41 over which the tubular projection 36 is telescoped. A pressure surface 44 is formed on the cap which abuts the pressure shoulder 39 of the tubular projection 36. The cap 40 has an axial fluid passage 42 and a generally cylindrical transverse nozzle-receiving opening 43 communicating with the axial passage 42. The axial passage 42 communicates with the internal passage 37 of the tubular projection 36 to provide a passage for the material to be dispensed.

An examination of the drawing will reveal that other than the crimped region 21 the only possible leakage region is between the enlarged head 34 and the annular shoulder 23. There are no other leakage regions possible because the metal valve cup 20 completely seals off the interior of the container 10 except for the two regions noted above. This is one of the great advantages of this invention. The leakage regions are reduced to a practical minimum, there being only one possible leakage region other than the crimped region.

A generally cylindrical hollow nozzle 45 is disposed in the nozzle-receiving opening 43. This nozzle is slightly larger in diameter than the opening 43 and is forced therein causing an inward distention of the nozzle thus firmly securing the nozzle in place. The nozzle 45 has a discharge aperture 46 of a selected size. It is readily apparent that any one of a plurality of nozzles 45 having different discharge aperture sizes may be utilized in the cap 40 without changing the tooling needed to produce the cap. This permits a very simple piece, i.e. the nozzle, to be made with a plurality of discharge aperture sizes and the proper size utilized for a particular application. This is one of the great advantages of this invention.

The illustrated embodiment is for use with a dip tube and for such applications the container is used in the upright position. A dip tube 50 is shown telescoped over the tubular extension 22 of the valve cap 20.

The valve mechanism is easily adaptable for use without a dip tube wherein the container is used in the inverted position. The construction and operation of the assembly is identical except that the dip tube is not employed.

Operation

When the valve assembly is in the closed position as shown in FIGURE 1 fluid is prevented from escaping by the fluid tight seal of the enlarged head 34 and the annular shoulder 23. To discharge the contents of the container, the cap is depressed which causes the pressure surface 44 to exert a pressure against the pressure shoulder 39. This depressing causes the diaphragm 31 to flex downwardly and simultaneously moves the valve stem 33 axially. This moves the enlarged head 34 away from the annular shoulder 23 opening a fluid passage therebetween.

The distance of the axial movement into the open or discharge position of the assembly is limited by the webs 35 abutting the valve cup 20. This will insure that the diaphragm has sufficient resiliency in the open position to urge the valve stem back to the closed position when pressure is released from the cap 40.

The fluid is forced through the dip tube 50 between the annular shoulder 23 and the enlarged head 34 around the valve stem 33, and into the tubular extension 22. The fluid thence passes through the inlet ports 38, through the axial passage 42, and is discharged into the atmosphere through the discharge aperture 46. The diaphragm skirt 32, sealed in the annular recess 26, prevents the fluid from passing between the diaphragm and the wall of the cup.

When pressure is released from the cap 40 the diaphragm 31 flexes upwardly moving the valve stem axially back to the position shown in FIGURE 1. This urges the enlarged head 34 into sealing engagement against the annular shoulder 23.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A valve assembly for a pressure container having a circular opening comprising,
    (a) an annular cup having an outer lip adapted to engage the rim of the container opening fluid tightly;
    (b) said cup including a depending tubular portion terminating at a lower valve seat opening;
    (c) said cup including wall portions defining an annular recess between the lip and the tubular portion;
    (d) a valve member including an annular resilient diaphragm projecting into the recess and having a hole therethrough;
    (e) some of said wall portions overlying the diaphragm to maintain the diaphragm therein;
    (f) the valve member including a stem projecting through the tubular portion in spaced relationship therewith and terminating at a head overlying the valve seat;
    (g) the valve member including circumferentially spaced webs connecting the stem and diaphragm and affording dispensing communication between the hole in the diaphragm and the space between the stem and the tubular portion; and,
    (h) said diaphragm normally biasing the valve head into sealing engagement with the valve seat.

2. The device of claim 1 wherein the cup is a one piece drawn metal member.

3. The device of claim 1 wherein the valve member is a one piece molded plastic member.

References Cited in the file of this patent

UNITED STATES PATENTS

| | | |
|---|---|---|
| 2,582,262 | Loven et al. | Jan. 15, 1952 |
| 2,686,652 | Carlson et al. | Aug. 17, 1954 |
| 2,696,934 | Ashton | Dec. 14, 1954 |
| 2,697,635 | Ivins et al. | Dec. 21, 1954 |
| 2,744,665 | Carlson et al. | May 8, 1956 |
| 2,808,183 | Olson et al. | Oct. 1, 1957 |
| 2,854,176 | Edwards | Sept. 20, 1958 |
| 2,883,090 | Remane | Apr. 21, 1959 |
| 2,912,173 | Edwards | Nov. 10, 1959 |
| 2,973,123 | Rousset | Feb. 28, 1961 |
| 3,033,473 | Kitabayashi | May 8, 1963 |